April 17, 1951  J. P. HANSEN  2,549,195
MAGAZINE CAMERA
Filed Aug. 4, 1947
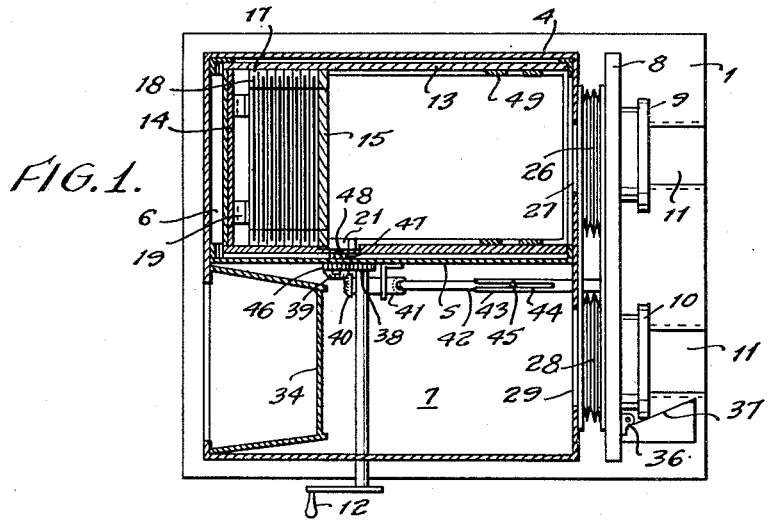
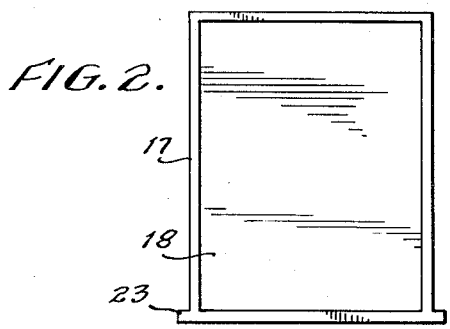
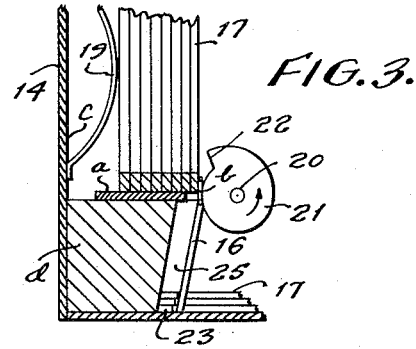
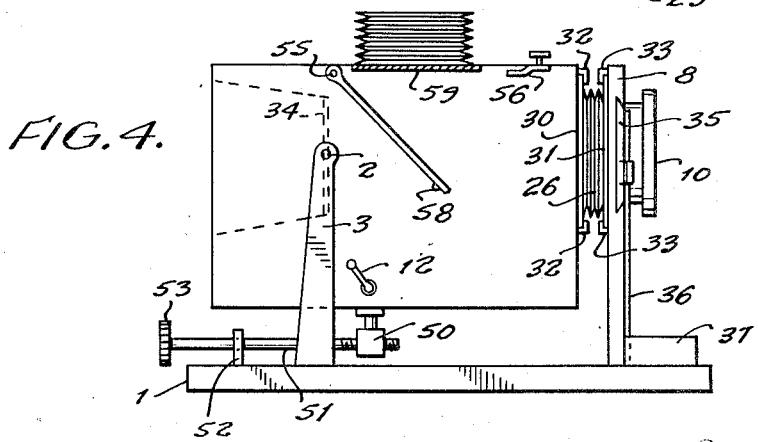
INVENTOR.
Jens Peter Hansen
BY Patented Apr. 17, 1951

2,549,195

UNITED STATES PATENT OFFICE 2,549,195

MAGAZINE CAMERA

Jens Peter Hansen, Copenhagen, Denmark

Application August 4, 1947, Serial No. 765,999
In Sweden April 2, 1940

Section 1, Public Law 690, August 8, 1946
Patent expires April 2, 1960

2 Claims. (Cl. 95—19)

The present invention relates to a magazine camera provided with two compartments, each of which has a lens. The one compartment serves for adjustment of the focussing screen, and the other compartment contains the carriers for the plates. The plate in the carrier ready for exposure is in alignment with the focussing screen, and the two lenses are interconnected for forced guiding together, thus allowing visual examination of the image till the very moment of exposure. Such cameras of hitherto known construction are subjected to various disadvantages, as careful examination must be made every time the shutter is to be operated that an unexposed plate is in position within the camera, and as it is necessary to carry out the changing of plate carriers in a darkroom.

The object of the present invention is to provide a magazine camera of the type described above, and in which the aforesaid disadvantages have been remedied.

The invention is more explicitly explained in the following description with reference to the accompanying drawing, in which Fig. 1 is a horizontal sectional view of a camera according to the invention, Fig. 2 a plate carrier, Fig. 3 a changing device for plates, and Fig. 4 a side elevation of the camera.

The magazine camera is mounted on a base plate 1 and provided with two pivot pins 2 journaled in posts 3 attached to the base plate, see Fig. 4, for oscillation of the camera in a vertical plane.

Referring to Fig. 1, the magazine camera comprises a box 4 which by means of a partition 5 is divided into two separate chambers 6 and 7 that are relatively light-tight. Chamber 6 serves as exposure chamber, and chamber 7 serves as adjustment chamber.

A frame 8 is attached to the front end of box 4. This frame carries a plate lens 9 and a focussing screen lens 10, and is displaceable in a horizontal plane being guided in paths 11 formed in the base plate 1. On its rear side the frame 8 is provided with a shutter of conventional type arranged behind the lens 9, and this shutter is connected in such a manner to the camera operating handle 12 that upon rotation of this handle an exposure can only take place if an unexposed plate is in position within the exposure chamber 6.

The plate carriers are disposed within a container 13 which by means of a lid not included in the drawing is closed light-tight. A sliding door 14 is arranged at the rear end of this container, the front end of which has a similar door that is removed when the container is inserted in the exposure chamber.

Across the upper part of the container is attached a rod 15, and the lower end of the container is provided with a support $a$ for the carriers 17 containing the unexposed plates 18. Beneath the support $a$ at each side of the box is a lath 16, Fig. 3. Against the rod 15 and a projection $b$ on either side of the support $a$ the row of vertically disposed carriers with unexposed plates is pressed by means of springs 19 on the inner side of a plate $c$ which is held in position by means of the sliding door 14. The plate $c$ has attached to its lower end a block $d$ that extends beneath the support $a$. The insertion and removal of unexposed and exposed plates respectively takes place in a darkroom, whereas the insertion and removal of the container may take place in daylight.

The container 13 is provided with a horizontal shaft 20 which carries a disc 21, Fig. 3, provided with a notch 22. As shown in Fig. 2 each carrier 17 has at its lower end a projection 23 on each side which after insertion of the carriers in the container 13 abut the projection $b$. Excepting only the foremost carrier 17, the right hand carrier in Fig. 3, which is held in position by means of the pressure from springs 19 against the rod 15 and the projections $b$, all the carriers rest upon the support $a$. The foremost surface of the block $d$ and the laths 16 are somewhat rearwardly inclined and provide between them a guiding slot 25 for the carriers while being changed. When the disc 21 and its notch 22 in the manner described below performs a full revolution, the foremost carrier 17 is pressed downwards against the resistance of spring 19, and when the upper edge of the carrier is released by the rod 15 the carrier falls by its own weight to the position indicated by 17$a$ in Fig. 3, its exposed surface being turned downwards.

After exposure of all the plates in the carriers 17, they will lie in a pile on the bottom of the container 13, whereupon this container with the exposed plates, after insertion of the sliding doors, may be taken out of the box in daylight, but the removal of the carriers and exposed plates from the container must only be carried out in a darkroom.

The frame 8, Figs. 1 and 4, is attached to the box 4 by means of bellows 26 in front of the aperture 27 to the exposure chamber 6, and other bellows 28 in front of the aperture 29 to the adjustment chamber for the focussing screen 34 in chamber 7. The bellows 26 and 28 are attached to two plates 30 and 31 guided in rails 32 and 33 on the box 4 and the frame 8 relatively.

As the parallax between the two lenses and the image may vary as the distance between the lenses and the image varies, special arrangements are provided to alter the parallax accordingly, even though it of course cannot be fully assessed, because the focussing screen, Fig. 1, shall be in the plane of the front plate 18. To obtain the said assessment the focussing screen lens 10 is mounted displaceably in a horizontal direction on a vertical support 35 which is guided in slots in the frame. This support carries an arm 36 the lower end of which abuts a curved edge 37 to the effect that the lens 10 is displaced towards the lens 9, when the frame with the two lenses approach the image. Other arrangements may be provided for the relative displacement of the two lenses 9 and 10 when the frame 8 is displaced, thus for instance the support 35 may be provided with a bell crank lever coacting with a curved surface on the base 1.

Operation of the camera is effected by means of a crank handle 12, the shaft of which carries a toothed wheel 38 operating through a gear transmission a conical gear 39 that engages another conical gear 40 on a shaft 41 connected by means of a universal joint to a shaft 42. This shaft is enclosed within a tube 43 provided with a slit 44 engaging a pin on the shaft 42 in such a manner that the tube 43 may be displaced longitudinally on the shaft, but is continually rotated thereby. This tube 43 extends through the front of the box 4 into the frame 8, where it is connected in such a manner to the operating mechanism of the shutter that exposure takes place when the crank handle 12 reaches a predetermined position in its rotational movement.

The disc 21 with its notch 22 is likewise operated by means of the handle 12, as the toothed wheel 38 is in engagement with a toothed wheel 46 on a shaft 47 journaled in the wall, which shaft on the opposite side of this wall has an incision 48 in which the square end of the disc shaft 20 enters when the container 13 is inserted into the chamber 6.

To damp the noise of the carriers with exposed plates when falling, the inner walls of the container 13 are provided with leaf springs 49 between which the edges of the carriers slide when falling to the bottom of the container 13.

In order to be able to incline the camera with its focussing screen and plate in relation to the image, the base is provided with a nut 50 that is engaged by a screw spindle 51 journaled in a ball bearing 52 and having at its one end a milled head 53 by means of which it is rotated by the operator. The base 1 may, similar to any other camera, be mounted on a tripod or like stand.

In order that the image may be seen in upright position on the focussing screen, a mirror 54 may in known manner be arranged in the adjustment chamber 7. This mirror is rotatably mounted to a shaft 55 and is held in horizontal position by means of a catch 56, in which position of the mirror the focussing screen 34 is employed. When released, the mirror drops against a stop member 58 attached to the wall of the chamber 7, and the image is now visible in right position on a ground glass disc 59 in the upper wall of the camera. By means of an exterior handle, not shown, the mirror 54 may again be turned up to its horizontal position. Instead of the mirror 54 and the ground glass disc 59 a corresponding mirror and ground glass disc may be arranged parallel to the side wall of the camera, the mirror being arranged to a corresponding angle in relation to the ground glass disc, and adjustment is then made while standing at the side of the camera. The mirror 54 and ground glass disc may furthermore be arranged for adjustment from the one position to the other.

I claim:

1. In a magazine camera, in combination, a casing; a magazine containing light sensitive elements, the said magazine being removably disposed in said casing; slidable means for rendering said magazine light impervious; a plurality of carriers for said light sensitive elements; projections formed on said carriers; a shaft rotatably arranged in a wall of said magazine; the said shaft having an exteriorly protruding head; a cam member provided at the inner end of said shaft for engaging said projections; a motion transmitting mechanism permanently disposed in said casing for actuating said shutter; a connecting element for disengageably connecting said protruding head and said motion transmitting mechanism thereby permitting withdrawal of said magazine from said casing while permitting simultaneous operation of said shutter and removal of said plates when said magazine is inserted in said casing.

2. In a magazine camera in combination, a casing; a magazine containing light sensitive elements, the said magazine being removably disposed in said casing; slidable means for rendering said magazine light impervious; a plurality of carriers for said light sensitive elements; projections formed on said carriers; a support provided in the rear portion of said magazine for maintaining said carriers in positions spaced from the bottom of the magazine; a guide member arranged along the front end of said support and beneath the foremost carrier, the said guide member being adapted to be engaged by said projections; a transverse rod disposed in the upper portions of the magazine and bearing against the upper end of the foremost carrier; a shaft rotatably arranged in a wall of said magazine, the said shaft having an exteriorly protruding head; a cam member provided at the inner end of said shaft for engaging said projections and thereby lowering said carriers out of reach of said transverse rod; a motion transmitting mechanism permanently disposed in said casing for actuating said shutter; a connecting element for disengageably connecting said protruding head and said motion transmitting mechanism thereby permitting withdrawal of said magazine from said casing while permitting simultaneous operation of said shutter and removal of said plates when said magazine is inserted in said casing.

JENS PETER HANSEN.

REFERENCES CITED

The following references are of record in the file of this patent:

UNITED STATES PATENTS

| Number | Name | Date |
|---|---|---|
| 434,090 | Plaul | Aug. 12, 1890 |
| 536,820 | Robinson | Apr. 2, 1895 |
| 679,271 | Barnekov | July 23, 1901 |
| 1,210,164 | Hansen | Dec. 26, 1916 |
| 1,400,277 | Folmer | Dec. 13, 1921 |
| 1,612,860 | Fairchild | Jan. 4, 1927 |
| 1,984,420 | Moulin | Dec. 18, 1934 |